United States Patent
Doumani et al.

(10) Patent No.: US 8,474,358 B2
(45) Date of Patent: Jul. 2, 2013

(54) PULL ROD RELEASE MECHANISM FOR A PUSH-PULL TABLE TOOL

(75) Inventors: Robert S. Doumani, Hoffman Estates, IL (US); Jan Koegel, Arlington Heights, IL (US); Eric Hendrickson, Palatine, IL (US); Venu Samprathi, Barrington, IL (US); Brian Chung, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 354 days.

(21) Appl. No.: 12/821,884

(22) Filed: Jun. 23, 2010

(65) Prior Publication Data
US 2011/0314986 A1    Dec. 29, 2011

(51) Int. Cl.
B26D 1/16    (2006.01)
(52) U.S. Cl.
USPC .......................... 83/477.1; 83/477.2; 83/485
(58) Field of Classification Search
USPC ............. 83/477, 477.1, 477.2, 490, 483, 485, 83/487, 471.1, 471.2
See application file for complete search history.

(56) References Cited

U.S. PATENT DOCUMENTS

| | | | |
|---|---|---|---|
| 2,601,878 A | | 7/1952 | Anderson |
| 2,852,047 A | * | 9/1958 | Odlum et al. ................... 83/473 |
| 4,958,544 A | | 9/1990 | Miyamoto |
| 5,819,624 A | | 10/1998 | Brault et al. |
| 5,931,209 A | | 8/1999 | Chang |
| 6,293,176 B1 | | 9/2001 | Talesky |
| 6,370,997 B1 | * | 4/2002 | Rugen et al. .................... 83/100 |
| 6,463,837 B2 | * | 10/2002 | Andersen et al. ............ 83/477.1 |
| 7,343,840 B2 | * | 3/2008 | Liu et al. ....................... 83/477.2 |
| 7,441,487 B2 | | 10/2008 | Liu et al. |

FOREIGN PATENT DOCUMENTS

| | | |
|---|---|---|
| DE | 2904685 A1 * | 8/1980 |
| DE | 4244149 A1 * | 6/1994 |
| EP | 2145711 A2 | 1/2010 |

OTHER PUBLICATIONS

International Search Report and Written Opinion in corresponding PCT Application (i.e., PCT/US2011/040493), mailed Oct. 6, 2011 (11 pages).
Mafell, "Erika 70 E", available at: http://www.mafell.com/produkte/prod_saegen_erika70_i.htm, downloaded on Jun. 22, 2010 (2 pages).
Mafell, Photograph of Erika 70 E, available at: http://www.mafell.com/images/produktbilder_hochaufgeloest/erika70.jpg, downloaded on Jun. 22, 2010 (1 page).

* cited by examiner

*Primary Examiner* — Kenneth E. Peterson
*Assistant Examiner* — Jennifer Swinney
(74) *Attorney, Agent, or Firm* — Maginot, Moore & Beck (57) ABSTRACT

In at least one embodiment, a table saw includes a table, a moveable carriage supported by the table, a saw assembly supported by the carriage, and a pull rod coupled to the carriage. The pull rod is configured to move in a linear direction relative to the housing between a back position and a forward position. The carriage and saw assembly move in the linear direction when the pull rod is moved in the linear direction. A collar is positioned on the pull rod and configured to move in the linear direction between a locked position and an unlocked position. The pull rod is configured to move in the linear direction from the back position toward the forward position when the collar is in the unlocked position, and the pull rod is blocked from moving from the back position when the collar is in the locked position.

11 Claims, 8 Drawing Sheets

PULL ROD RELEASE MECHANISM FOR A PUSH-PULL TABLE TOOL

TECHNICAL FIELD

This disclosure relates to the field of to table-top power tool devices operated with pull rods, and to table top saws in particular.

BACKGROUND

Table-top power tools are used in a wide variety of applications including wood working and metal working. Table-top power tools are typically mounted to a flat work surface, the table, configured to accept and guide work piece to the table-top tool. These power tools allow users to operate with more precision on larger work pieces than allowed with hand-held power tools. While table-top power tools are mounted to the table, the angle and position of the tool may be adjusted during operation. Some table-top power tools use one or more pull rods to change the position of the table top tool.

An example of a table-top power tool using a pull rod is a table saw which includes a circular saw blade. The circular saw blade extends through the table top surface, and a work piece, typically a piece of wood, is placed on the table top for cutting. The saw blade assembly is mounted on rails running along the length of the table, and the saw blade may be pushed or pulled along the rails in response to pushing or pulling on the pull rod. If the saw is activated, the spinning saw blade cuts through work pieces placed in its path on the table. In some existing table saws, the pull rod is also used to adjust the height of the circular saw blade. This adjustment is carried out by rotating the pull rod along its longitudinal axis in either a clockwise or counter-clockwise direction. The rotation of the pull rod increases and decreases the height of the saw blade above the table surface, depending upon the direction of rotation of the pull rod.

The pull rod may also be configured to lock the blade in a fixed position relative to table top in order to provide a rip saw mode of operation. In the rip saw mode, the pull rod locks the circular saw blade into a fixed position on the rails, and the work piece may then be moved over the saw-blade to cut the work piece.

The pull rod may also be configured to lock itself and the circular saw blade in place to allow for safety and/or transportation of the table saw with the blade in a secured position. Existing pull rods that are locked into position require two or more steps to unlock. For example, some known pull rod assemblies require a central button to be pushed in while simultaneously pulling outward on the pull rod to unlock it. These pull rod assemblies are generally difficult for an operator to unlock.

In view of the foregoing, it would be advantageous to provide a locking and unlocking mechanism for a pull rod assembly that permits unlocking the pull rod using fewer motions than traditional pull rod assemblies. It would also be advantageous to provide a locking and unlocking mechanism for a pull rod assembly configured to unlock the pull rod using few motions while permitting the pull rod to rotate on its longitudinal axis.

SUMMARY

In at least one embodiment, a table saw includes a table, a moveable carriage supported by the table, a saw assembly supported by the carriage, and a pull rod coupled to the carriage. The pull rod is configured to move in a linear direction relative to the housing between a back position and a forward position. The carriage and saw assembly move in the linear direction when the pull rod is moved in the linear direction. A collar is positioned on the pull rod and configured to move in the linear direction between a locked position and an unlocked position. The pull rod is configured to move in the linear direction from the back position toward the forward position when the collar is in the unlocked position, and the pull rod is blocked from moving from the back position when the collar is in the locked position.

In at least one embodiment, a table saw includes a table, a moveable carriage supported by the table, a saw assembly supported by the carriage, and a pull rod coupled to the carriage. The pull rod is configured to move in a linear direction relative to the housing between a back position and a forward position. The carriage and saw assembly move in the linear direction when the pull rod is moved in the linear direction, and a lock is configured to retain the pull rod in the back position. The lock includes an actuator configured to move in the linear direction between a locked position and an unlocked position. The pull rod is configured to move in the linear direction from the back position toward the forward position when the actuator is in the unlocked position, and the pull rod is blocked from moving from the back position when the actuator is in the locked position.

In at least one embodiment, a table tool with a retention mechanism includes a table having a table top, a carriage assembly coupled to the table top and movable in relation to the table top, and a pull rod assembly connected to the carriage assembly. The pull rod assembly is configured to move in a linear direction, and movement of the pull rod assembly in a linear direction results in movement of the carriage assembly in relation to the table top. The pull rod assembly includes a pull rod, a detent movably supported by the pull rod and positionable in a blocking position and a recessed position, and a collar movably positioned on the rod. The collar is engaged with the detent such that movement of the collar causes movement of the detent between the blocking position and the recessed position. The pull rod is inhibited from moving in the linear direction in relation to the table top when the detent is in the blocking position, and the pull rod is allowed to move in the linear direction in relation to the table top when the detent is in the recessed position.

DETAILED DESCRIPTION OF THE DRAWINGS

For the purposes of promoting an understanding of the principles of the embodiments disclosed herein, reference will now be made to the drawings and descriptions in the following written specification. It is understood that no limitation to the scope of the subject matter is thereby intended. It is further understood that the present disclosure includes any alterations and modifications to the illustrated embodiments and includes further applications of the principles of the disclosed embodiments as would normally occur to one skilled in the art to which this disclosure pertains.

Figure 1:
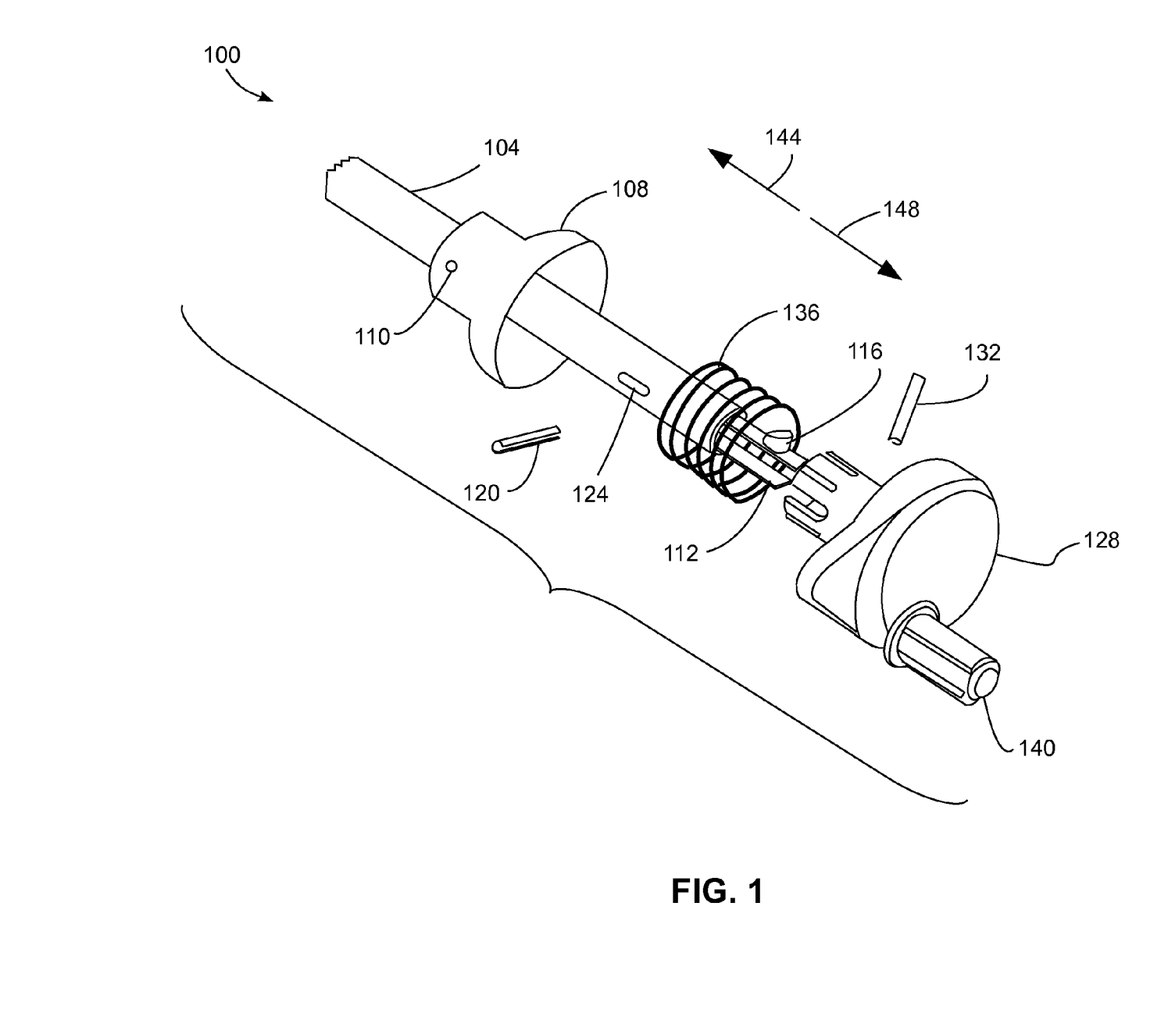
FIG. 1 depicts an exploded view of an exemplary embodiment of a pull rod locking mechanism having a collar as part of a pull rod handle.

Referring to FIG. 1, a pull rod assembly 100 includes a pull rod shaft 104, collar 108, leaf spring 112 affixed to a detent 116, and handle 128. A roll pin 120 engages through hole 110 in collar 108 to pass through clearance slot 124. Roll pin 120 secures collar 108 to pull rod shaft 104, while allowing collar 108 a limited range of motion to slide along a longitudinal axis of pull rod shaft 104 indicated by arrows 144 and 148. In the embodiment of FIG. 1, collar 108 completely surrounds pull rod shaft 104, but alternative collars may be semi-circular or U-shaped and surround only a portion of the pull rod shaft 104. Handle 128 engages the end of pull rod shaft 104 via handle roll pin 132, enclosing leaf spring 112 and detent 116 within pull rod shaft 104. A knob, seen here as pull rod handle 128, engages pull rod shaft 104 in a fixed manner such that rotation of pull rod handle 128 causes rotation of pull rod shaft 104. Pull rod crank handle 140 is positioned in the proximity of an outer diameter of pull rod handle 128 to facilitating clockwise or counterclockwise rotation of pull rod handle 128 and pull rod 104. Collar compression spring 136 surrounds pull rod shaft 104 and is affixed to pull rod handle 128 and collar 108.

Figure 2:
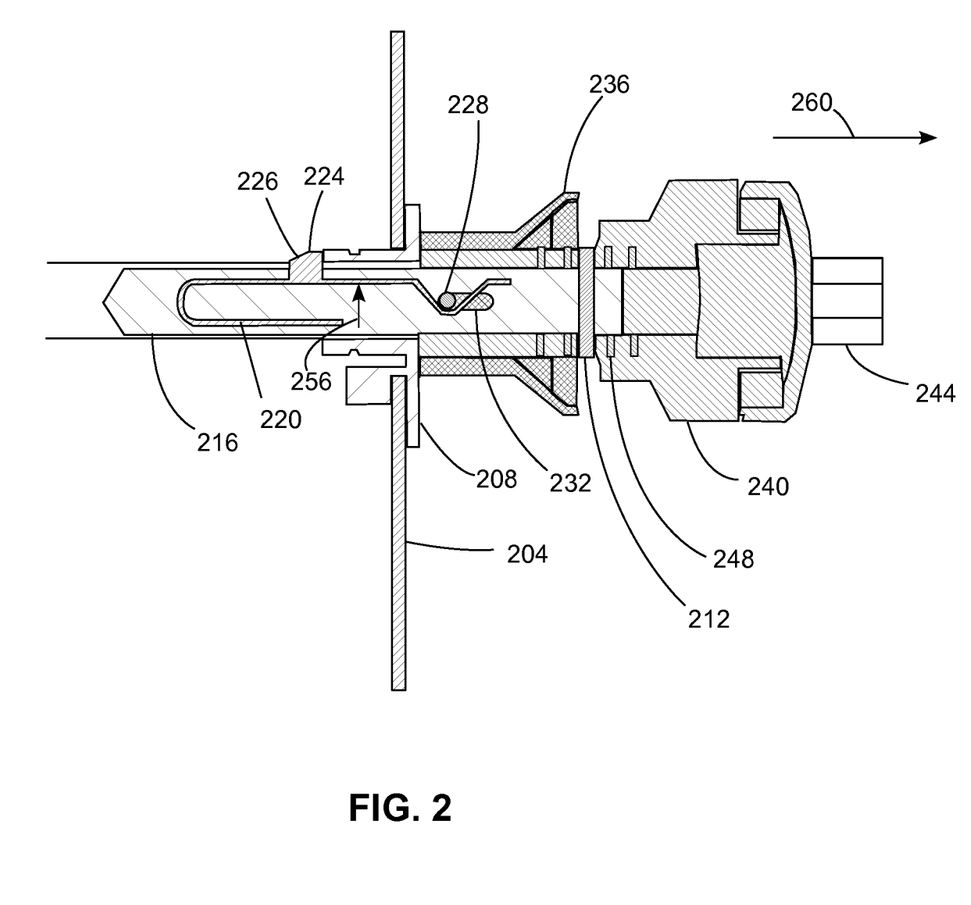
FIG. 2 depicts a cross sectional view of the pull rod locking mechanism of FIG. 1 with a collar, detent, and pull rod in a locked position.

Referring to FIG. 2, the pull rod assembly is seen in a locked position through a side of a table housing 204 with pull rod shaft 216. In FIG. 2 the pull rod assembly is in a back position at the maximum range of movement towards the interior of table housing 204. Pull rod shaft 216 passes through a bushing 208 located at an opening through housing 204. Collar 236, handle 240, and crank handle 244 are positioned outside bushing 208, while detent 224 engages a hole in pull rod shaft 216 on the inside of bushing 208. Handle 240 is secured to pull rod shaft 216 by handle roll pin 212.

In the embodiment of FIG. 2, detent 224 is a tapered button with a beveled leading edge 226. When pull rod shaft 216 is in the locked position of FIG. 2, detent 224 is positioned on the interior side of housing 204 and bushing 208. A lock actuator such as collar 236 is in a locked position with roll pin 228 at an end of clearance slot 232 proximate to bushing 208. In this position, leaf spring 220 is in an extended position exerting a force in direction 256 urging detent 224 into a blocking position through pull rod shaft 216. Collar 236 is seen in a locked position with pull rod handle 240, with collar compression spring 248 in an extended position biasing collar 236 into the locked position. Collar compression spring is affixed at one end to collar 236 and at another end to pull bar handle 240. When detent 224 is in the locked position of FIG. 2, the pull rod assembly is locked to housing 204. In the locked position, the detent 224 abuts the bushing 208 when the pull rod shaft 216 is urged in the direction of arrow 260, blocking the pull rod shaft 216 from moving in the linear direction. Thus, the pull rod shaft 216 remains in the locked position in response to a pulling force applied to handle 240 in direction 260. Pull rod shaft 216 remains in the locked position, but is free to rotate in response to clockwise or counterclockwise forces exerted on handle 240 or crank handle 244.

Figure 3:
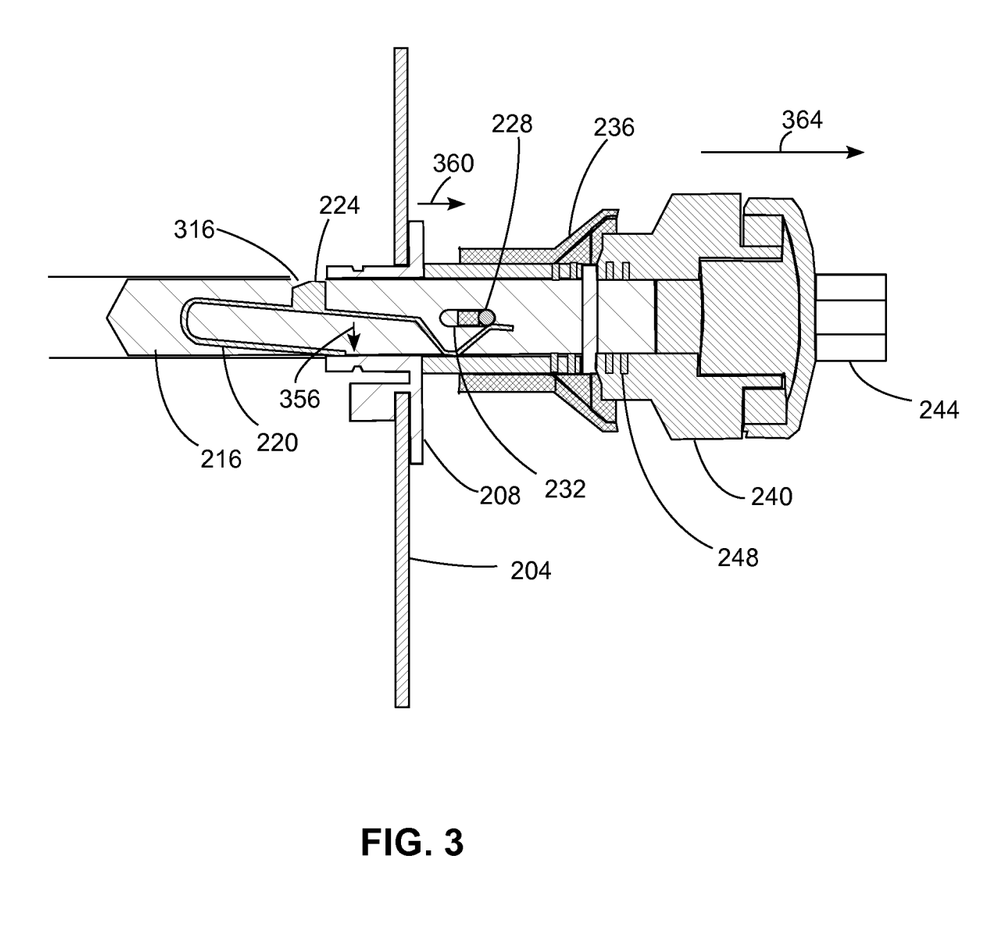
FIG. 3 depicts a cross sectional view of the pull rod locking mechanism of FIG. 1 with the collar and detent in an unlocked position.

The pull rod assembly configuration of FIG. 2 with the detent in an unlocked position is shown in FIG. 3. Collar 236 is configured to be pulled away from housing 204 and bushing 208 in direction 360. In the configuration of FIG. 3, collar 236 is displaced towards handle 240 in an unlocked position, compressing collar compression spring 248. When the collar 236 is moved in direction 360, roll pin 228 is also displaced in direction 360 to a position at an end of clearance slot 232 that is distal to bushing 208. Movement of the roll pin 228 to this position compresses leaf spring 220 in direction 356. Leaf spring 220 compresses in direction 356, such that detent 224 is moved in direction 356 to a recessed position with respect to detent button hole 316 disposed in pull rod shaft 216. Thus, roll pin 228 slideably engages leaf spring 220 when collar 236 is moved in direction 360. If a force pulling collar 236 in direction 360 is released, collar compression spring 248 urges collar 236 to return the position depicted in FIG. 2.

In the configuration of FIG. 3, pull rod shaft 216 is unlocked, moving detent 224 out of an intersection path with bushing 208 and allowing pull rod shaft 216 to travel in direction 364 in response to a pulling force applied to handle 240. Additionally, in the unlocked position, pull rod shaft 216 may rotate in response to a clockwise or counterclockwise force exerted on handle 240 via crank handle 244.

Figure 4:
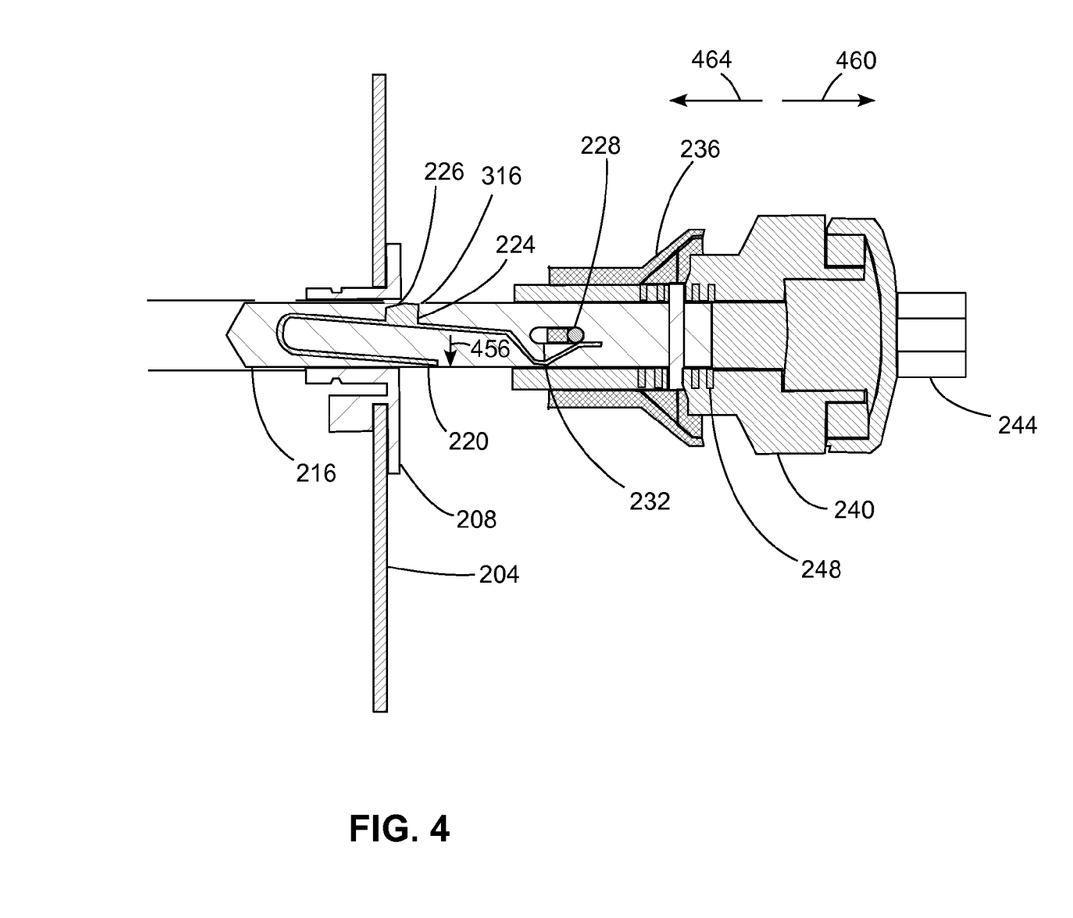
FIG. 4 depicts a cross sectional view of the pull rod locking mechanism of FIG. 1 with the collar and detent in an unlocked position, and the pull rod partially disengaged from a table edge.

The pull rod assembly of FIG. 3 is seen in a partially extended position in FIG. 4 (i.e. between a back position and a forward position). In FIG. 4, pull rod shaft 216, leaf spring 220, detent 224, collar 236, pull rod handle 240, and crank handle 244 are displaced away from housing 204 toward a forward position in direction 460. Collar 236 is in an unlocked position pulled towards handle 240, compressing collar compression spring 248. Roll pin 228 is at the position at the end of clearance slot 232 that is distal to bushing 208. In the example of FIG. 4, roll pin 228 compresses leaf spring 220 in direction 456, which in turn removes detent 224 from detent button hole 316. In the position of FIG. 4, if collar 236 is released, allowing collar compression spring 248 to expand in direction 464 and move roll pin 228 in direction 464, beveled detent edge 226 may alternatively engage bushing 208. When engaged to bushing 208 in this manner, detent 224 and pull rod shaft 216 may travel in either direction 460 or 464. Thus, in the configuration of FIG. 4, pull rod shaft 216 is free to slide either away from housing 204 in direction 460, or towards housing 204 in direction 464, regardless of the position of collar 236. Pull rod shaft 216 is also free to rotate in response to a clockwise or counterclockwise force exerted on handle 240 or crank handle 244.

Figure 5:
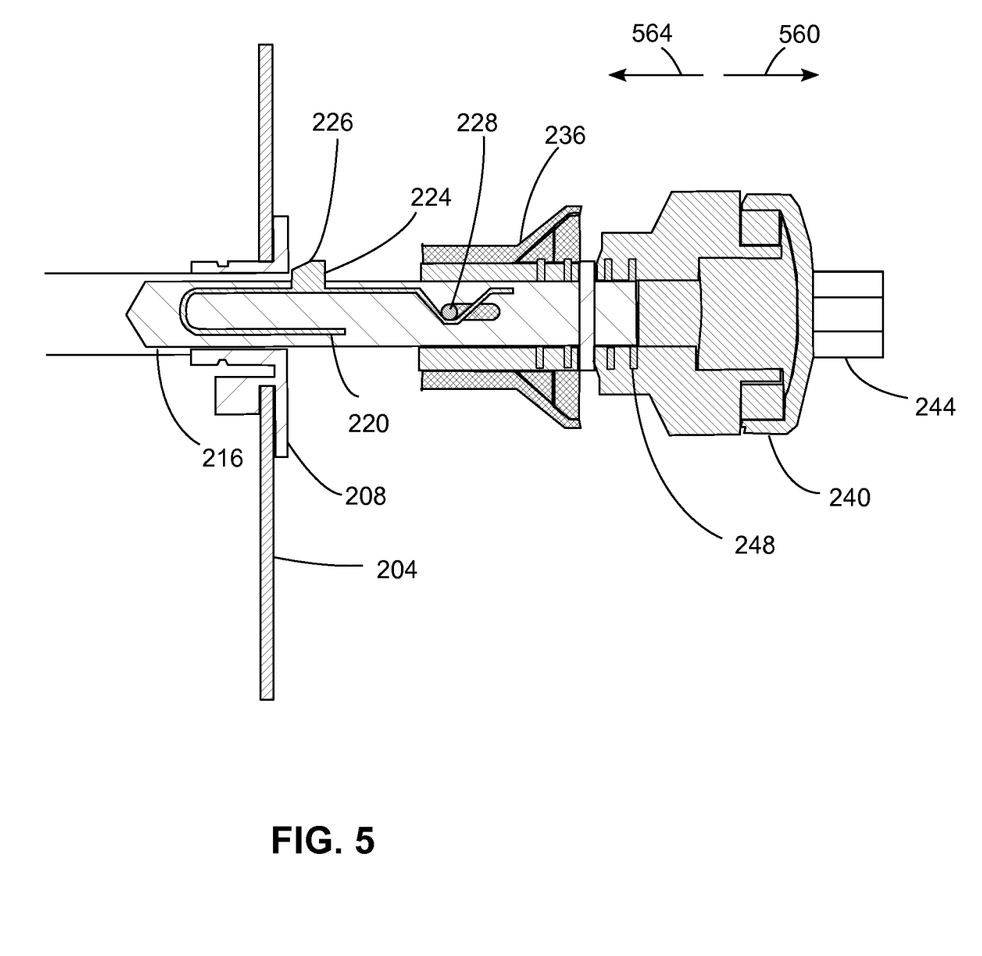
FIG. 5 depicts a cross sectional view of the pull rod locking mechanism of FIG. 1 with the collar and detent in a locked position and the pull rod disengaged from the table edge.

The pull rod assembly of FIG. 4 with a locking mechanism fully disengaged from the table housing is seen in FIG. 5. Collar compression spring 248 is in an extended position, with roll pin 228 positioned at an end of clearance slot 232 proximate to bushing 208. Leaf spring 220 urges detent 224 through pull rod shaft 216. In the configuration of FIG. 5, pull rod shaft 216 is free to move in either direction 560 or 564. Pull rod shaft may move in direction 560 toward a forward position for a predefined distance that is determined by the intended range of motion of the table saw. Pull rod shaft 216 is also free to rotate in response to a clockwise or counterclockwise force exerted on handle 240 or crank handle 244.

With continued reference to FIG. 5, if pull rod shaft 216 is moved in direction 564, beveled edge 226 of tapered detent 224 engages bushing 208, and detent 224 is displaced to the interior of pull rod 216, toward the recessed position. If the motion continues in direction 564, detent 224 is moved past the inner circumference of bushing 208, allowing detent 224 to slide along the inner surface of bushing 208. Further continued movement in the direction 564 moves the detent 224 past the rear edge of bushing 208 and locks the pull rod shaft 216 in the configuration seen in FIG. 2. In this manner, pull rod shaft 216 may be locked by pushing handle 240 in direction 564 until handle 240 contacts bushing 208 as seen in FIG. 2. Accordingly, there is no need for the user to pull the collar 236 to return the pull rod to the locked position.

Figure 6:
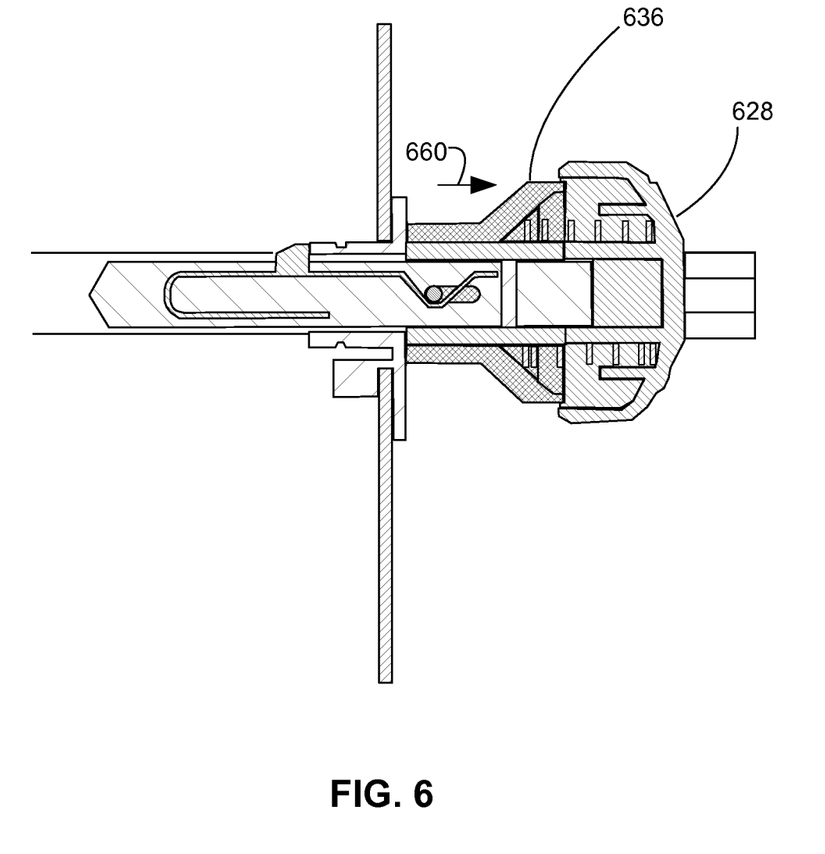
FIG. 6 depicts a cross sectional view of an embodiment of a pull rod locking mechanism including a collar that slideably engages an interior portion of a pull rod handle.
Figure 7:
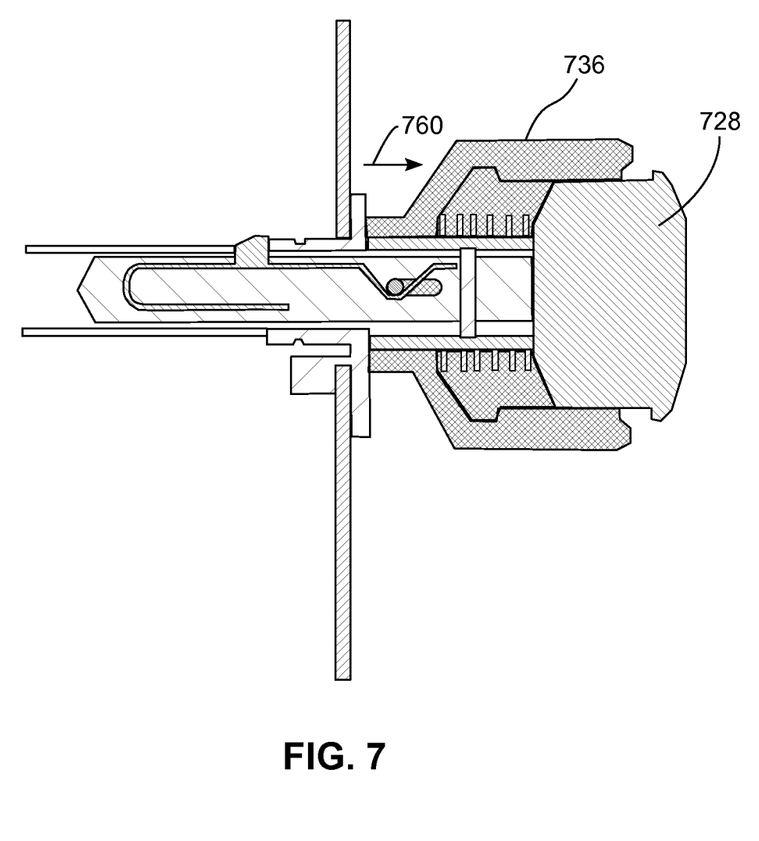
FIG. 7 depicts a cross sectional view of an embodiment of a pull rod locking mechanism including a collar that slideably engages an exterior portion of a pull rod handle.

Referring to FIG. 6, an embodiment of a pull rod assembly with a collar configured to engage an interior portion of a pull rod handle is shown. Collar 636 has an outer surface having a diameter narrower than that of pull rod handle 628. When pulled in direction 660, collar 636 moves to the interior of pull rod handle 628. An alternative to the embodiment of FIG. 6 is the pull rod assembly of FIG. 7. In FIG. 7, collar 736 has an inner surface engaging an outer surface of pull rod handle 728. When pulled in direction 760, collar 736 moves over the exterior of pull rod handle 728. Both of the embodiments of FIG. 6 and FIG. 7 are suitable for operation with the pull rod assemblies depicted in FIG. 1-FIG. 5.

Figure 8:
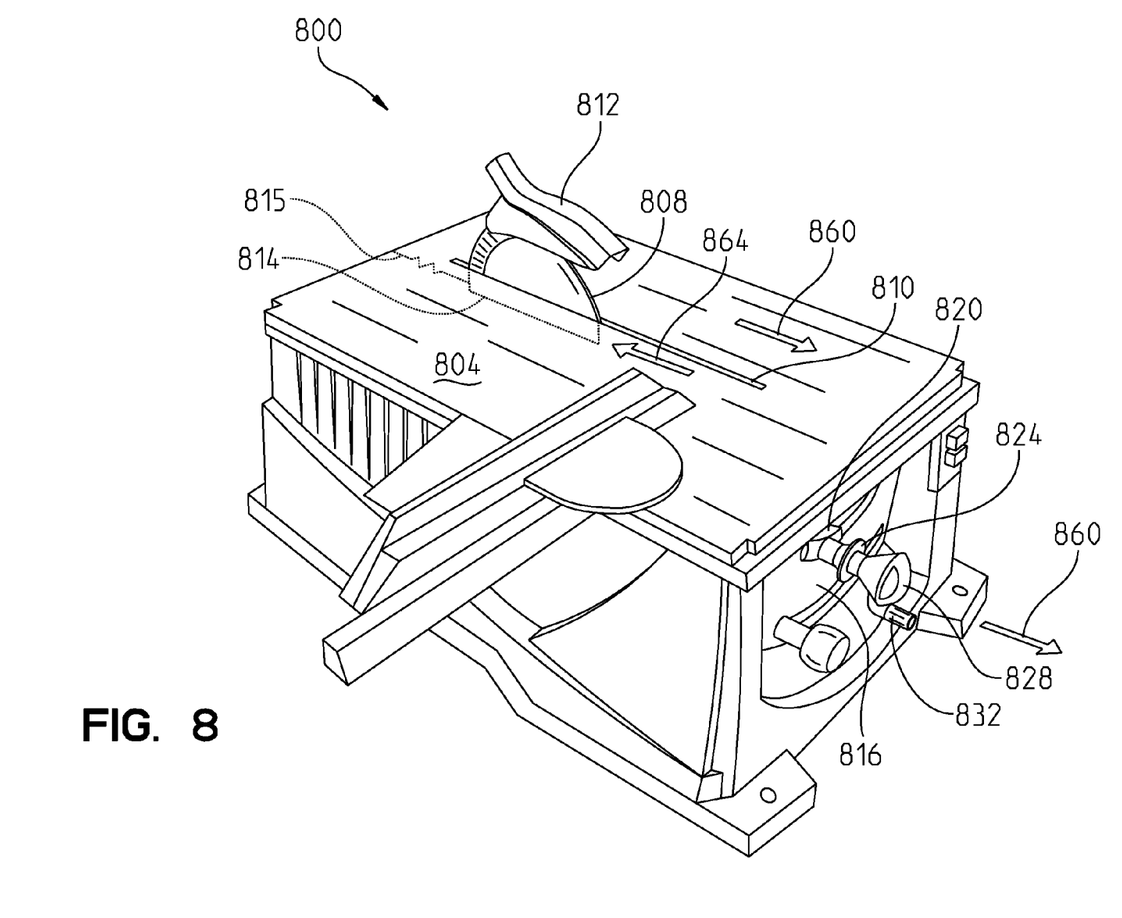
FIG. 8 depicts a perspective view of a table saw using the pull rod assembly disclosed herein.

A push-pull table saw employing the pull rod locking assembly discussed above is depicted in FIG. 8. Table saw 800 includes a table surface 804, circular saw blade 808, blade guard 812, carriage 814, and table housing 816. Bushing 820 extends from table housing 816 with a pull rod extending through bushing 820, collar 824, and pull rod handle 828. In the configuration of FIG. 8, the pull rod is in a locked position. A saw operator may unlock the pull rod assembly by pulling pull rod handle 828 in direction 860 while squeezing collar 824 toward pull rod handle 828 in direction 860. Once unlocked from housing 816, the pull rod pulls a carriage 814, which is supported by, and may slide over, guide rods or tracks beneath table surface 804. Carriage 814 supports blade 808 and blade guard 812, which move in direction 860 along blade track 810. Also once unlocked, pull rod handle 812 may be rotated in a clockwise or counterclockwise direction using crank handle 832. This rotation adjusts the height of saw blade 808 and blade guard 812 above table surface 804. A work piece, such as a piece of wood, placed in blade path 810 is cut by rotating circular blade 808. In the embodiment of FIG. 8, the degree of linear motion of blade 808 and blade guard 812 in direction 860 is the same as the degree of linear motion of carriage 814 and pull rod handle 828 in direction 860.

The saw 800 of FIG. 8 may be locked by returning the pull rod assembly to the position depicted in FIG. 8. A return spring 815 operatively connected to the carriage 814 and the table housing 816 urges the carriage 814 and the pull rod including pull rod handle 828 and collar 824 towards the locked position in direction 864. Once locked, saw blade 808 and blade guard 812 are prevented from moving in direction 860. Saw blade 808, blade guard 812, and carriage 814 are locked automatically when the operator releases the pull rod, allowing the return spring 815 to return the saw 800 to the locked position depicted in FIG. 8. Alternatively, an operator may also push the pull rod handle 828 in direction 864 until the pull rod assembly locks in place with housing 816.

In a locked mode of operation a pull rod in a table top power tool is prevented from sliding in a linear direction by a locking detent disposed within a housing of a table. The locked pull rod may rotate in a clockwise or counterclockwise direction to further adjust the table top power tool. The pull rod assembly may be unlocked by an operator squeezing the collar against the pull rod handle while pulling the pull rod handle away from the housing in a linear direction matching the direction of movement of the table top tool. This motion continues until the locking detent button moves past the interior of the table housing, at which point the collar may be released.

In an unlocked mode of operation, a pull rod assembly may travel a linear direction toward or away from a housing of a table. A power tool such as a circular saw may move in response to movement of the pull rod. The unlocked pull rod may also rotate in a clockwise or counterclockwise direction to further adjust the position of the table top power tool. Upon the pull rod being released, a return spring urges carriage and the unlocked pull rod to return to the locked position with the detent inside of the housing. The detent button locks automatically with the detent button hole disposed inside the housing. The operator can release the pull rod any distance from the locked position during pulling and the carriage will retract automatically to the home back locked position In one embodiment, the pull rod handle contacts a bushing disposed on the exterior of the table housing when in the locked position.

The foregoing pull rod assembly has advantages over existing pull rod mechanisms. One advantage is that the pull rod may be unlocked by an operator by squeezing the collar and the pull rod handle together instead of requiring a more complex unlocking procedure. Another advantage is that, once unlocked, the pull rod returns to a locked position and the carriage is locked automatically when the pull rod is released by an operator.

While the invention has been illustrated and described in detail in the drawings and foregoing description, the same should be considered as illustrative and not restrictive in character. For example, while the disclosed embodiments are directed to a table saw, other table top tools including drill presses or lathes may be modified to use the pull rod locking assembly disclosed above. It is understood that only the preferred embodiments have been presented and that all changes, modifications and further applications that come within the spirit of the invention are desired to be protected.

What is claimed is:

1. A table saw comprising
   a table;
   a moveable carriage supported by the table;
   a saw assembly supported by the carriage;
   a pull rod coupled to the carriage, the pull rod configured to move in a linear direction relative to the housing between a back position and a forward position, wherein the carriage and saw assembly move in the linear direction when the pull rod is moved in the linear direction; and
   a collar that at least partially surrounds the pull rod and is configured to move in the linear direction along the pull rod between a locked position and an unlocked position, wherein the pull rod is configured to move in the linear direction from the back position toward the forward position when the collar is in the unlocked position, and wherein the pull rod is blocked from moving from the back position when the collar is in the locked position;
   wherein the pull rod includes a detent mechanism supported within the pull rod that is movable between a first position at which the detent mechanism protrudes from the pull rod and a second position at which the detent mechanism is recessed within the pull rod, and
   wherein the collar includes a pin that is oriented transversely with respect to a longitudinal axis of the pull rod and that extends through a slot in a side portion of the pull rod to engage the detent mechanism such that, when the collar is in the locked position, the detent mechanism is in the first position, and when the collar is in the unlocked position, the detent mechanism is in the second position.

2. The table saw of claim 1 further comprising a knob on the end of the pull rod, and wherein the collar is biased away from the knob toward the locked position.

3. The table saw of claim 2 wherein the collar completely encircles the pull rod.

4. The table saw of claim 1 wherein the detent mechanism includes a leaf spring, and
wherein the pin slideably engages the leaf spring positioned in the pull rod, and
wherein the pin compresses the leaf spring when the collar is moved from the locked position to the unlocked position.

5. The table saw of claim 4 wherein the detent mechanism includes a detent button, and
wherein the leaf spring is connected to the detent button,
wherein the detent button extends through a hole in the push rod when the leaf spring is uncompressed, and
wherein the detent button is moved to a recessed position within the pull rod when the leaf spring is compressed by the pin when the collar is moved from the locked position to the unlocked position.

6. The table saw of claim 1, wherein the collar moves away from the table when moving from the locked to the unlocked position.

7. A table saw comprising:
a table;
a moveable carriage supported by the table;
a saw assembly supported by the carriage;
a pull rod coupled to the carriage, the pull rod configured to move in a linear direction relative to the housing between a back position and a forward position, wherein the carriage and saw assembly move in the linear direction when the pull rod is moved in the linear direction; and
a lock configured to retain the pull rod in the back position, the lock including an actuator configured to move in the linear direction between a locked position and an unlocked position, wherein the pull rod is configured to move in the linear direction from the back position toward the forward position when the actuator is in the unlocked position, and wherein the pull rod is blocked from moving from the back position when the actuator is in the locked position;
wherein the actuator comprises a collar that at least partially surrounds the pull rod and is configured to slide along the pull rod between the locked position and the unlocked position, and
wherein the lock includes a detent mechanism that is supported within the pull rod, and the collar further includes a pin that extends perpendicular to the pull rod and through a slot in the pull rod to engage the detent mechanism, the detent mechanism protruding from the pull rod when the collar is in the locked position and being retracted within the pull rod by the collar when the collar is in the unlocked position.

8. The table saw of claim 7 wherein the collar is positioned between a knob on the end of the pull rod and a front plate on the table.

9. The table saw of claim 7 wherein the detent mechanism includes a detent button attached to a leaf spring, the detent button positioned in a hole in the pull rod, the detent button configured to move to a recessed position in the hole when the collar is in the unlocked position, and the detent button configured to move to an extended position in the hole when the collar is in the locked position.

10. The table saw of claim 9 wherein the leaf spring biases the detent button toward the extended position, and wherein the detent button engages the front plate when the pull rod is in the back position and is urged toward the forward position and prevents the pull rod from moving to the forward position, and wherein a return spring is coupled to the carriage and configured to urge the carriage and the pull rod towards the back position.

11. The table saw of claim 7, wherein the collar moves away from the table when moving from the locked to the unlocked position.

* * * * *